United States Patent Office 3,301,734
Patented Jan. 31, 1967

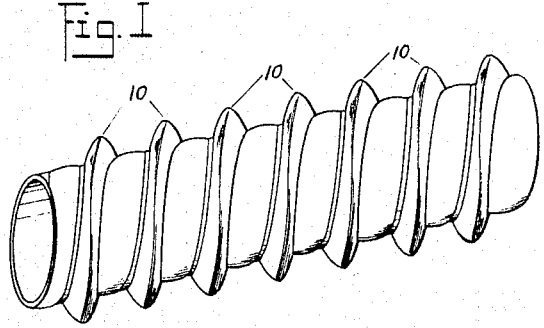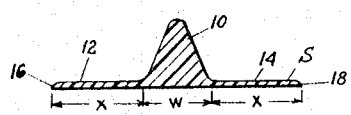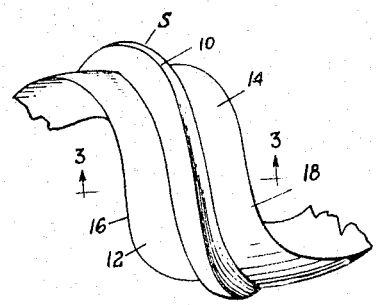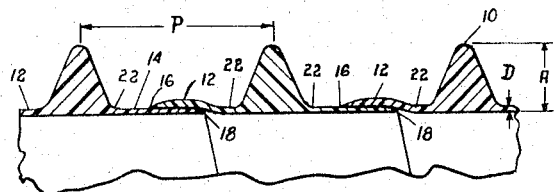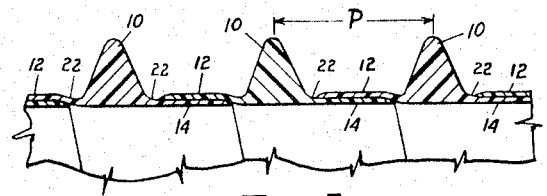

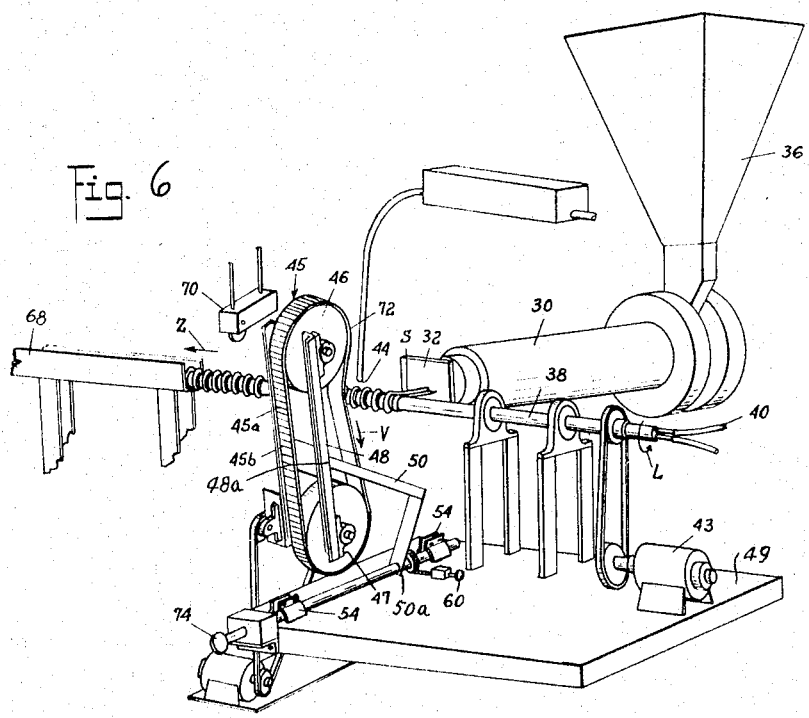
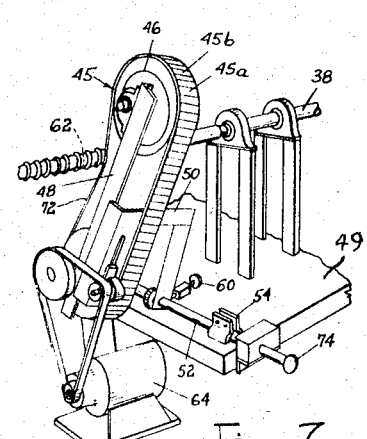
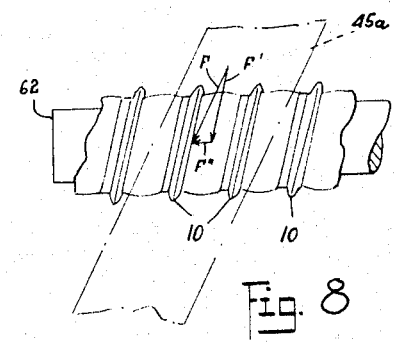
INVENTORS
PHILIP S. BRITTON AND
HELMUT P. FOCHLER
BY TEARE, FETZER & TEARE
ATTORNEYS

3,301,734
APPARATUS FOR FORMING FLEXIBLE, THIN WALLED PLASTIC TUBING
Philip S. Britton, Tiburon, Calif., and Helmut P. Fochler, Chagrin Falls, Ohio, assignors, by mesne assignments, to Continental Oil Company, a corporation of Delaware
Original application Apr. 24, 1962, Ser. No. 189,733, now Patent No. 3,243,328, dated Mar. 29, 1966. Divided and this application May 27, 1965, Ser. No. 459,187
12 Claims. (Cl. 156—425)

This invention relates in general to plastic tubing and more particularly to an apparatus for producing high strength, relatively thin walled plastic tubing. This is a divisional application of the pending United States patent application of Philip S. Britton, et al., Serial No. 189,733, filed April 24, 1962, now Patent No. 3,243,328.

Plastic tubing is useful for conveying fluids or liquids from one place to another under a great variety of environmental situations. One of such situations is where the tubing is used to convey water from an irrigation ditch to adjacent fields for irrigating the fields. Such tubing heretofore was generally either in the form of a more or less rigid pipe type, or of a flexible pipe type, with any such flexibility of the tubing being generally provided strictly by the elasticity of the material used in forming the tubing. The more or less rigid pipe type, while of generally good strength, including good crush resistance, could not, of course, be oriented after the manufacture thereof to conform to angles and bends about which the tubing passed, and therefore did not always find adequate support for the tubing, unless the tubing was preformed during its manufacture into a particular configuration, the latter limiting its use. The flexible pipe type generally possessed this ability to conform to the contour of supporting surfaces, but it generally did not possess sufficient strength, and especially sufficient crush resistance, due to the elasticity of the material necessary to provide the desired flexibility of the pipe. Moreover, when fluid, such as water, was flowing through the pipe, the ability of the elastic flexible pipe to retain its originally oriented curved or angled configuration diminished, with the pressurized fluid tending to straighten the pipe out and change its positional relation.

The apparatus of the present invention provides a generally thin walled tubing or pipe which may possess considerable flexibility, which can be provided in a large range of diameter sizes, which possesses high strength, and especially very good crush-resistant strength, and which has the ability, if possessing flexible characteristics, to generally retain any originally oriented curved or angled configuration while fluid is flowing through the pipe. The apparatus also provides for the formation of a substantially non-flexible, high crush resistant plastic pipe in a novel manner.

Accordingly, an object of the invention is to provide a novel apparatus and/or system for the formation of high strength, relatively thin walled plastic tubing.

Another object of the invention is to provide a novel apparatus and/or system for the formation of a high strength, relatively thin walled plastic tubing, and wherein the latter possesses considerable flexibility characteristics even though the plastic material of the tubing is of generally non-elastic type.

A still further object of the invention is to provide a novel apparatus for the continuous production of relatively thin walled, high strength plastic tubing including means for extrusion of a flanged strip of plastic material having an intermediate rib portion, means for winding the strip of plastic material in spiral form on a mandrel with adjacent flanges of the strip being disposed in overlapping relation to form the tubing product, and means for moving the tubing axially of the mandrel away from the extrusion point.

Another object of the invention is to provide a novel apparatus and/or system for the production of relatively thin walled, high strength plastic tubing comprising the oriented disposition of a rotatable mandrel, a plastic extrusion device for extruding a strip of plastic material onto the mandrel, and stripper means for engaging the tubing product and moving it in an axial direction with respect to the mandrel.

A further object of the present invention is to provide a stripper means of the character described which comprises an endless, flexible means, motive means for rotating the flexible means in partial wrap around engagement with the tubing, and means mounting the flexible means for selective angular and partial wrap around engagement with the tubing.

Other objects and advantages of the invention will be apparent from the following description taken in conjunction with the accompanying drawings wherein:

FIG. 1 is a generally perspective view of a plastic tubing product constructed in accordance with the method and apparatus system of the instant invention;

FIG. 2 is an enlarged, fragmentary view of a strip of plastic material used to form the spirally wound, finalized tubing product of FIG. 1;

FIG. 3 is an enlarged, sectional view, taken substantially along the plane of line 3—3 of FIG. 2, looking in the direction of the arrows, and showing positional and general size relationships of the ridge portion of the strip material with respect to the lateral flange portions thereof;

FIG. 4 is a fragmentary sectional view of one form of the generally flexible, plastic tubing product formed with the method and apparatus system of the instant invention and utilizing the strip material of FIGS. 2 and 3;

FIG. 5 is a view generally similar to that of FIG. 4, but illustrating a modified form of the tubing, which modified form is of a generally non-flexible type;

FIG. 6 is a generally perspective, more or less diagrammatic illustration of an apparatus for producing the tubing;

FIG. 7 is a fragmentary view of a portion of the apparatus shown in FIG. 6, and more particularly the belt mechanism for moving the tubing off the mandrel, and taken from the opposite side of said mechanism as compared to that illustrated in FIG. 6;

FIG. 8 is a diagrammatic illustration of the force applied to the tubing by the belt mechanism of FIGS. 6 and 7 to move the tubing product off the mandrel in a continuous operation.

Referring now again to the drawings, and in particular to FIGS. 1 to 4 thereof, there is illustrated a piece of flexible type tubing provided in accordance with the instant invention. The tubing is formed from strip-like material S (FIGS. 2 and 3) spirally wound in overlapped relation with adjacent convolutions of the spirally wound strip, and heat bonded into a finalized tubing product. As can be best seen in FIGS. 2 and 3, the strip-like material S comprises a preferably exterior ridge or rib portion 10 disposed intermediate laterally disposed flange portions 12 and 14.

The strip-like material is preferably formed of a thermoplastic, such as for instance polyethylene or rubber modified styrene, having more or less non-elastic properties. The polyethylene may range from a low density type to a high density type, and the plastic material may also be formed of a mixture of polyethylene and other polymeric materials, such as polyisobutylene. Plasticized polyvinyl chloride may also be utilized.

The thickened rib portion 10 provides for considerable strengthening of the finalized tubing product, since as can be seen from FIGS. 1 to 4, such substantially rigid rib portion extends radially a substantial amount in spirally wound or helically extending relation about the exterior of the tubing, thereby providing considerable crush resistant strength to the finalized tubing product.

Referring now in particular to FIG. 4, in accordance with the invention, in order to provide generally flexible characteristics to the finalized tubing product, the strip S of generally non-elastic material is spirally wound and secured in overlapping relation with the adjacent convolutions of the strip, so that the outer boundary edges 16 and 18 of flanges 12 and 14 respectively of one convolution are disposed in longitudinally spaced (or axially spaced with regard to the finalized tubing product) relation to the respective rib portion 10 of the adjacent convolutions of the tubing, and so on along the tubing for the full length thereof.

It will be seen therefore that with such an arrangement, a thicker dimension of the wall of the tubing through a portion of the longitudinal dimension between adjacent rib portions of the tubing is provided, together with relatively thinner wall portions of the tubing. Thus when the tubing is bent to conform the same to a curved or angular contour, the relatively thin wall sections 22 of the flange portions 12 and 14 on the underside (FIGS. 6 and 7), or minimum radius bend of the tubing, fold or crease inwardly as shown at 24 in FIG. 7, to provide considerable flexibility characteristics to the high strength tubing.

Referring now again to FIG. 4, it has been determined that the pitch distance P, or in other words the distance between the centers of adjacent rib portions of the convolutions of the tubing, should be at least 1.7 times the width distance X of one of the flanges of the tubing and preferably in the range of 1.7 to 2 times the distance X, in order to provide the flexibility and high strength characteristics to the tubing. In this connection, the width X of each of the flange portions 12 or 14 of the strip material is in the general range of 1.3 to 2 times the maximum width W (FIG. 3) of the rib portion 10 of the strip. When such pitch distance P is less than the aforementioned 1.7 times the width distance X, the tubing has very little if any flexible characteristics, and may be classified as more or less of an inflexible high strength type tubing. Thus it will be understood that providing the tubing product with predetermined size or extent of relatively thinner wall sections between the helically extending rib portions 10 provides a product of high strength characteristics, but one which has flexibility, whereby the tubing can be bent or deformed into an arcuate contour, for ready use of the tubing around curved support surfaces.

Referring again to FIG. 4, the thickness D of the flange portions 12 and 14 will effect the flexibility of the tubing since if D is increased the flexibility will tend to decrease, but for the relatively thin walled tubing with which the present invention is concerned, such tubing having an internal diameter of at least thirty times the dimension D, any variance of D within the range of relevancy specified between the internal diameter of the tubing produce and the dimension D will have relatively little effect on flexibility.

The following list is given for the aforementioned dimensions P, X, W, and D for various internal diameter sizes of tubing product produced in accordance with the method and apparatus of the invention. These sizes of tubing are adapted for use as siphon tubes in the aforementioned irrigation environment. There is also listed a dimension A (FIG. 4) which indicates the preferred height of the rib portion 10 of the strip material for the tubing sizes listed. It will be noted that the various sizes of tubing are grouped in two columns, with the life hand column designating tubing having flexible characteristics, or in other words wherein the distance P equals at least 1.7 times the distance X, and with the right hand column designating tubing having non-flexible characteristics, or in other words wherein the distance P is less than the aforementioned 1.7 times the distance X.

| Flexible | Non-Flexible |
|---|---|
| 1″ tubes: | 1″ tubes: |
| P .735 | P .485 to .610 |
| X .383 | X .383 |
| W .235 | W .235 |
| D .030 | D .030 |
| A .312 | A .312 |
| 1¼″ tubes: | 1¼″ tubes |
| P .700 | P .450 |
| X .275 | X .275 |
| W .200 | W .200 |
| D .030 | D .030 |
| A .210 | A .210 |
| 1½″ tubes: | 1½″ tubes |
| P .715 | P .465 to .590 |
| X .393 | X .393 |
| W .215 | W .215 |
| D .025 | D .025 |
| A .275 | A .275 |
| 2″ tubes: | 2″ tubes: |
| P 1.010 | P .635 |
| X .495 | X .495 |
| W .260 | W .260 |
| D .025 | D .025 |
| A .200 | A .200 |

It will be understood that the above are illustrative only and so long as the minimum ranges of aforedescribed relationships are maintained, a novel tubing product will be produced in accordance with the instant invention.

It will be seen that the flexible type tubing is ideally suited for conforming to the contour of a supporting surface, such as the banks of the irrigation ditch illustrated, and readily adapts itself to many environmental uses where it is desirable to have a relatively thin walled high strength plastic tubing for carrying fluid, and where it is desirable to conform the tubing to a supporting surface, and assuring retention of the tubing in whatever position placed.

Referring now to FIG. 5, there is shown a modified form of the tubing in which the spirally wound convolutions of the strip-like material forming the tubing product are wound closer together as compared with that of FIG. 4, whereby the end boundaries of flanges 12 and 14 on the convolutions are disposed closer to the adjacent ridge or rib portion of the adjacent convolution. It will be seen that such an arrangement decreases the longitudinal or axial dimensions of the thinner wall sections 22 of the tubing, and leaves a lesser amount of such thinner wall portions for inward folding or creasing upon bending of the tubing. Thus such a tubing product has very little if any flexibility since such reduced size or extent of thinner wall sections are not sufficient to provide for any creasing of the tubing product in the manner aforedescribed. In this connection the pitch distance P' between adjacent rib portions 10 of the tubing is less than the aforementioned 1.7 times the width distance X of the flange portions of the strip material of the tubing, and as aforementioned and as indicated in the right hand column of the above exemplary list, results in a substantially non-flexible tubing product. However, such tubing product has great strength characteristics and especially very good crush resistance.

In accordance with the present invention and referring now to FIG. 6, there is illustrated one form of apparatus arrangement which may be utilized to produce both the aforementioned flexible and generally non-flexible tubing products. Such apparatus comprises an extruder 30 of conventional well known type having an extruding head 32 thereon. The plastic raw material, such as polyethylene, is deposited in the hopper 36 of the extruding machine and is extruded out of the head portion 32 in heated condition, to be spirally wound upon rotating mandrel 38. Mandrel 38 is preferably hollow and may be internally cooled as by means of the pressurized water duct 40 extending into one end thereof. As the hot strip-like material S is wound upon the mandrel, the adjacent convolutions are heat-bonded together due to the residual heat of the plastic material, after which a cooling fluid is applied thereto, as at 44, to cool the tubing product sufficiently for further operations thereon. The mandrel driven by preferably adjustable speed motor 43, is rotating in the direction of the arrow L illustrated in FIG. 6.

There is provided a stripper mechanism 45 mounted on a base 49 for moving the spirally wound tubing product axially of and off of the mandrel. Such mechanism comprises an endless belt 45a formed of rubber or the like, the outer surface of which is roughened as at 45b and as illustrated, and with such belt being mounted upon spaced rotatable drums 46, 47 which are connected by support means 48. Belt 45a is adapted to move in the direction of arrow V. Support means 48 is fixedly mounted, as at 48a, by means of an L-shaped structure 50 fixedly mounted, as at 50a, on a rotatable shaft 52 which is mounted in support brackets 54 which in turn are fixedly mounted on the base 49. Shaft 52 is reciprocably movable in the support brackets 54 by actuating handle means 74 and is rotatably adjustable in the support brackets 54 by means of actuation handle 60. The angular relationship between the belt of the tubing stripping mechanism 45 and the tubing product, in a generally vertical plane extending parallel to the axis of the tubing, can be selectively changed, as for instance by actuating handle mechanism 60 which controls rotation of shaft 52 which in turn controls movement of the support structure 48, 50 and the stripper mechanism 45. This angular relationship of the movable belt 45a with respect to the tubing product is such that the belt engaging the tubing product on the mandrel urges it off the end 62 of the mandrel during rotation of the latter, and in the direction of the arrow Z illustrated in FIG. 6. Thus the tubing product is continually being formed during rotation of the mandrel and is continually being urged or moved off the mandrel by means of the belt mechanism 45. By adjusting the speed of the mechanism 45 and the angular disposition of the belt 45a correlated with speed of the mandrel, the pitch distance P between adjacent ridge portions of the tubing product can be varied, thereby providing for producing either a generally flexible tubing product or a generally non-flexible tubing product, depending upon the aforedescribed relationship between the pitch distance P and the flange width X. An adjustable speed motor 64 (FIG. 7) is provided which drives the belt of mechanism 45, and therefore, changes the speed of the belt, and thus aid in varying the pitch distance as aforementioned. As the tubing product is moved off of the mandrel, it may move along receiving trough 68 until the desired length of tubing product is produced, after which it can be severed by any suitable means, such as the preferably automatically actuated cutter 70, from the continually produced tubing on the mandrel. The driving stretch 72 of belt 45a preferably engages the tubing on mandrel 38 just below the upper drum 46 and in a partial wrap around relationship, thereby increasing the surface engagement between stretch 72 of the belt and the periphery of the tubing. Actuating handle means 74 may also be provided for moving the stripper mechanism 45 transversely with respect to the tubing, thereby providing for adjustment of the belt tension in its engagement with the tubing, and providing for the use of the mechanism with different sizes of mandrels in the production of different diameters of tubing product.

While only one extrusion machine and one mandrel 38 has been illustrated in the drawings, it will be understood that a plurality of extrusion heads and associated mandrels could be provided, all of which could be engageable with the belt 45a of the mechanism 45 to greatly increase the production of the apparatus. It will also be understood that while the mandrel 38 has been shown disposed in a horizontal position with the belt of the stripper mechanism 45 disposed in a generally vertical position, the mandrel could be disposed in a more or less vertical position and the belt disposed in a generally horizontally moving position, thereby providing more space for a plurality or gang of mandrels.

Referring now to FIG. 8, there is diagrammatically illustrated the relationship between the movable belt 45a of the tubing stripping mechanism 45 and the helically extending rib portions 10 on the tubing product. It will be seen that a major portion F' of the force F applied by the movable belt 45a to the tubing product is applied generally parallel to the angle of inclination of the rib portions of the convolutions of the product, while a portion F" of the force F is applied in a generally axial direction with respect to the tubing product, thereby moving the tubing product axially of and off of the mandrel. With the belt 45a angularly disposed (FIG. 8), it will be seen that if the speed of the belt is increased with respect to the speed of the mandrel, the greater portion of the increased force of the belt is applied parallel to the direction of inclination of the rib portions 10 of the tubing product, thereby increasing the rotary speed of the tubing product and with respect to the mandrel, and causing the pitch distance P between adjacent rib portions of the tubing product to decrease. The lubricating characteristics or low coefficient of friction of the aforementioned plastic materials, such as polyethylene, provides for comparatively ready relative movement between the tubing and the mandrel. In actual practice, the speed of the belt is preferably approximately the speed of the rotating mandrel 38. The cooling of the heated product after it has been spirally wound on the rotating mandrel is so arranged that while the adjacent convolutions are heat bonded to one another, they are in a sufficiently stable condition by the time they reach the movable belt 45a that they will not be deformed or injured by the movable belt. After the tubing product is received in the trough 68, it can be further cooled since it is still in a somewhat heated although very stable condition. This cooling can be accomplished either by air cooling or by subjecting the tubing product to a water spray or water bath or the like.

From the foregoing discussion and accompanying drawings it will be seen that the invention provides a novel apparatus and/or system for the production of a plastic tubing product for use in a variety of environmental settings, with such tubing product being formed from relatively inexpensive thermoplastic material, and which may still possess considerable flexible characteristics including the ability to retain a curved or angled orientation thereof even though liquid is flowing through the tubing, and by so arranging the pitch distance between adjacent rib portions of the tubing, the flexibility characteristics of the tubing can be varied. Moreover, it will be seen that the invention provides a novel apparatus and/or system for producing a high strength flexible tubing product formed of generally non-elastic plastic material and including wall structure comprising generally helically extending rib or ridge portions with flanged portions disposed intermediate the rib portions to define the wall structure of the tubing, and with such flange portions having generally spirally extending sections of lesser thickness than the remainder of the respective flange portion.

The terms and expressions which have been used are used as terms of description and not of limitation, and there is no intention in the use of such terms and expressions of excluding any equivalents of the invention shown or described, or portions thereof, but it is recognized that various modifications are possible within the scope of the invention claimed.

We claim:

1. A system for producing a relatively thin walled, high strength tubing product, comprising, a base, a rotatable mandrel mounted on said base, motive means operably connected for rotating said mandrel about its longitudinal axis, and extrusion means disposed adjacent said mandrel for extruding a strip of polymeric material onto the rotating mandrel, and rotatable means disposed adjacent said mandrel for moving said strip axially of and off said mandrel, said rotatable means including an endless, flexible belt disposed for engagement with the strip on said rotating mandrel, support means mounting the belt on said base for selective angular disposition of said belt with respect to the strip on said rotating mandrel in a generally vertical plane, extending generally parallel to the rotational axis of said rotating mandrel, and adjustable motor means operably connected for rotating said belt, thereby to move said tubing product axially at a different rate of speed than that of the axial movement imparted to said tubing product by rotation of said mandrel.

2. A system in accordance with claim 1, including cooling means mounted exteriorly of said mandrel for delivering a cooling medium to the exterior surface of said tubing product prior to the engagement by said belt.

3. An apparatus for use in producing a relatively thin walled, high strength tubing product of the type formed on a rotating mandrel comprising, a base, an endless, flexible means adapted for engagement with a tubing product, support means mounting said endless flexible means on said base for selective angular coacting engagement with a tubing product, and adjustable motor means operably connected for rotating said endless flexible means and adapted for moving a tubing product axially of and off a rotating mandrel.

4. An apparatus in accordance with claim 3, wherein said endless flexible means comprises a belt made from an elastomeric material, and wherein the support means includes a shaft rotatably mounted on said base for selectively angling said belt in a generally vertical plane, extending generally parallel to the rotational axis of a tubing product.

5. An apparatus for use in producing a relatively thin walled, high strength polymeric tubing product comprising, a base, a shaft rotatably mounted on said base, a support member fixedly connected at one end to said shaft, a support frame connected at the other end of said support member, a pair of laterally spaced, parallel rotatable members mounted on said frame, an endless, flexible belt disposed around said rotatable members, adjustable motor means operably connected to one of said rotatable members for driving said belt, and selectively adjustable means operably coacting with said shaft mounting said support frame for selectively angling said belt in a generally vertical plane.

6. An apparatus in accordance with claim 5, including a second selectively adjustable means operably coacting with said shaft mounting said support frame for selectively moving said belt generally transversely of said base.

7. An apparatus for use in producing a relatively thin walled, high strength tubing product of the type formed by extrusion onto a rotating mandrel comprising, a stationary base, an elongated shaft mounted for rotation about its longitudinal axis on said base, a generally L-shaped support structure fixedly connected at one end to said shaft, a support frame means connected at the other end of said support structure, a pair of laterally spaced, oppositely disposed rotatable members mounted for rotation adjacent the opposed ends of said support frame means, an endless, flexible belt trained around said rotatable members, an adjustable motor means operably connected to one of said rotatable members for driving said belt, and selectively adjustable means operably coacting with said shaft for selectively angling said belt in a generally vertical plane, extending generally parallel to the rotational axis of a mandrel.

8. A system for producing a relatively thin walled, high strength polymeric tubing product comprising, a base, a mandrel rotatably mounted on said base, an extrusion device disposed adjacent one side of said mandrel for extruding a strip of polymeric material onto said mandrel, motor means operably connected for rotating said mandrel about its longitudinal axis and for moving said strip axially of said rotating mandrel, a rotatable means disposed adjacent the opposite side of said mandrel for moving said strip axially of and off said rotating mandrel, said rotatable means including an endless, flexible belt disposed for partial wrap around engagement against an exterior portion of said strip, support means mounting said belt on said base for moving said belt into selective angular engagement with said strip, and adjustable motor means for rotating said belt for moving said strip axially at a different rate of speed than movement of said strip imparted by rotation of said mandrel.

9. A system in accordance with claim 8, including an external cooling means for delivering a cooling medium to the exterior surface of said strip prior to engagement by said belt.

10. A system in accordance with claim 8, including selectively adjustable means operably coacting with said support means for positioning said belt generally transversely with respect to said rotating mandrel.

11. A system in accordance with claim 8, wherein said mandrel is of a cylindrical hollow construction and includes cooling means for delivering a cooling medium to the interior of said mandrel.

12. A system in accordance with claim 8, including cutting means spaced laterally from said belt for cutting the tubing product formed on said rotating mandrel into predetermined size lengths.

References Cited by the Examiner
UNITED STATES PATENTS

| | | | |
|---|---|---|---|
| 2,502,638 | 4/1950 | Becht | 156—244 X |
| 2,587,211 | 2/1952 | Piazze | 156—498 X |
| 2,699,099 | 1/1955 | Robinson | 93—80 |
| 2,722,263 | 11/1955 | Beare et al. | 156—195 X |
| 2,748,805 | 6/1956 | Winstead | 156—244 X |
| 3,073,351 | 1/1963 | Nichols | |
| 3,133,483 | 5/1964 | Glasby | 93—80 |

EARL M. BERGERT, *Primary Examiner.*

P. DIER, *Assistant Examiner.*